(12) United States Patent
Lee et al.

(10) Patent No.: US 8,731,326 B2
(45) Date of Patent: May 20, 2014

(54) OBJECT RECOGNITION SYSTEM AND METHOD

(75) Inventors: Ji Hyo Lee, Yongin-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 302 days.

(21) Appl. No.: 13/197,114

(22) Filed: Aug. 3, 2011

(65) Prior Publication Data

US 2012/0051652 A1    Mar. 1, 2012

(30) Foreign Application Priority Data

Aug. 31, 2010 (KR) .................. 10-2010-0084495

(51) Int. Cl.
*G06K 9/66* (2006.01)
*G06K 9/36* (2006.01)

(52) U.S. Cl.
USPC ..................................... 382/284; 382/195

(58) Field of Classification Search
USPC .......... 382/190, 197, 195, 260, 219, 284, 294
See application file for complete search history.

(56) References Cited

U.S. PATENT DOCUMENTS 6,434,265 B1 * 8/2002 Xiong et al. ............. 382/154
8,165,401 B2 * 4/2012 Funayama et al. ....... 382/190
2008/0187213 A1 * 8/2008 Zhang et al. ............. 382/159
2009/0238460 A1 * 9/2009 Funayama et al. ....... 382/181
2012/0201466 A1 * 8/2012 Funayama et al. ....... 382/195

OTHER PUBLICATIONS

Akshay Bhatia, Hessian-Laplace Feature Detector and Haar Descriptor for Image Matching, Ottawa, Canada, 2007, http://www.site.uottawa.ca/~laganier/publications/thesis/akshay-thesis.pdf.*
Paul Viola, Robust Real-Time Face DetectionInternational Journal of Computer Vision 57(2), 137-154, 2004.*
Viola et al, Rapid Object Detection using a Boosted Cascade of SimpleFeatures, Accepted Conference on Computer Vision and Pattern Recognition 2001.*
Bay et al, SURF: Speeded Up Robust Features, Computer Vision and Image Understanding 110 (2008) 346-359.*

* cited by examiner

*Primary Examiner* — Andrae S Allison
(74) *Attorney, Agent, or Firm* — Stass & Halsey LLP

(57) ABSTRACT

An object recognition system including an image data storage unit to store a captured image, a feature extraction unit to extract an image having a predetermined rotational component among rotational components of the image stored in the image data storage unit and to extract feature vectors based on the extracted image, a database unit to store object information, a recognition unit to determine whether an object corresponding to the captured image is present in the database unit through comparison between the feature vectors extracted by the feature extraction unit and the object information stored in the database unit and to recognize information on the object stored in the database unit based on determination as to whether the object corresponding to the captured image is present in the database unit, and a system administration unit to receive the information on the object recognized by the recognition unit.

17 Claims, 5 Drawing Sheets

OBJECT RECOGNITION SYSTEM AND METHOD

CROSS-REFERENCE TO RELATED APPLICATIONS

This application claims the benefit of Korean Patent Application No. 2010-0084495, filed on Aug. 31, 2010 in the Korean Intellectual Property Office, the disclosure of which is incorporated herein by reference.

BACKGROUND

1. Field

Embodiments relate to an object recognition system and method using a feature extraction algorithm based on a model of human vision.

2. Description of the Related Art

In general, in the existing field of computer vision, object recognition proceeds in the following manner: a database of objects to be recognized is established offline, the objects are registered after training, the registered objects are recognized using a feature extraction algorithm and a recognizer, and determination as to whether the registered objects are present in an image which is currently input is made.

If a three-dimensional CAD model is used to establish the object database, a manual operation may be necessary and thus object feature extraction and registration are not useful in view of an actual robot service. Recently, an object feature extraction and registration technology which does not require a manual operation has been developed, but there is a limitation in providing object recognition that exhibits high resistance to environmental variation.

Environmental variation, as used in relation to object recognition, may be roughly divided into photometric invariance which occurs due to illumination variation, noise or the like and geometric invariance related to variation in camera angle or distance from an object. The reason why invariance elements are of importance is that, since types and features of objects used in homes and by individuals are different in view of a robot service, it may be difficult for an engineer to directly receive a desired list of objects from a user and to register the list in view of privacy protection, and the user may need to register objects. That is, since the user directly trains a robot online or offline with respect to objects, it is troublesome that a large number of images are collected so as to cope with object variation. It may be important to cope with a large amount of variation and to maintain a stable recognition rate through a single registration operation.

However, the existing object recognition system does not exhibit high resistance to environmental variation.

SUMMARY

It is an aspect of one or more embodiments to provide an object recognition system and method that extracts features exhibiting high resistance to environmental variation based on a model of human vision, thereby improving object recognition performance.

Additional aspects of embodiments will be set forth in part in the description which follows and, in part, will be obvious from the description, or may be learned by practice of the embodiments.

In accordance with an aspect of one or more embodiments, an object recognition system includes an image data storage unit to store a captured image, a feature extraction unit to extract an image having a predetermined rotational component among rotational components of the image stored in the image data storage unit and to extract feature vectors based on the extracted image, a database unit to store object information, a recognition unit to determine whether an object corresponding to the captured image is present in the database unit through comparison between the feature vectors extracted by the feature extraction unit and the object information stored in the database unit and to recognize information on the object stored in the database unit based on determination as to whether the object corresponding to the captured image is present in the database unit, and a system administration unit to receive the information on the object recognized by the recognition unit.

The feature extraction unit may include a feature point extractor, a feature point selector, and a feature vector creator.

The feature point extractor may include a Hessian feature point extractor to allow the image stored in the image data storage unit to pass through a filter having a predetermined rotational component so as to extract feature points.

The feature point extractor may extract candidate points, based on which feature vectors will be created, from the image information.

The feature point extractor may include a 0-degree feature point extractor to extract an image having a 0-degree rotational component among the rotational components of the image and to extract feature points based on the extracted image and a 45-degree feature point extractor to extract an image having a 45-degree rotational component among the rotational components of the image and to extract feature points based on the extracted image.

The feature point selector may select feature points from the candidate points extracted by the feature point extractor.

The feature point selector may determine whether coordinates overlap between the candidate points and select points having greater positional change as feature points when coordinates overlap between the candidate points.

The feature vector creator may create feature vectors based on the points selected by the feature point selector.

The recognition unit may determine whether a corresponding object is present in the database unit through comparison between the feature vectors extracted by the feature extraction unit and the database unit and recognize and transmit information on the object to the system administrator unit upon determining that the object is present in the database unit.

In accordance with another aspect of one or more embodiments, an object recognition method includes capturing an image of an object as image data, extracting an image having a predetermined rotational component among rotational components of the image data and extracting feature points based on the extracted image, determining whether coordinates overlap between the extracted feature points and selecting points having greater positional change as feature points when coordinates overlap between the extracted feature points, creating feature vectors based on the selected feature points, and determining whether a corresponding object is present in a database unit through comparison between the created feature vectors and the database unit and outputting information on the object upon determining that the object is present in the database unit.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
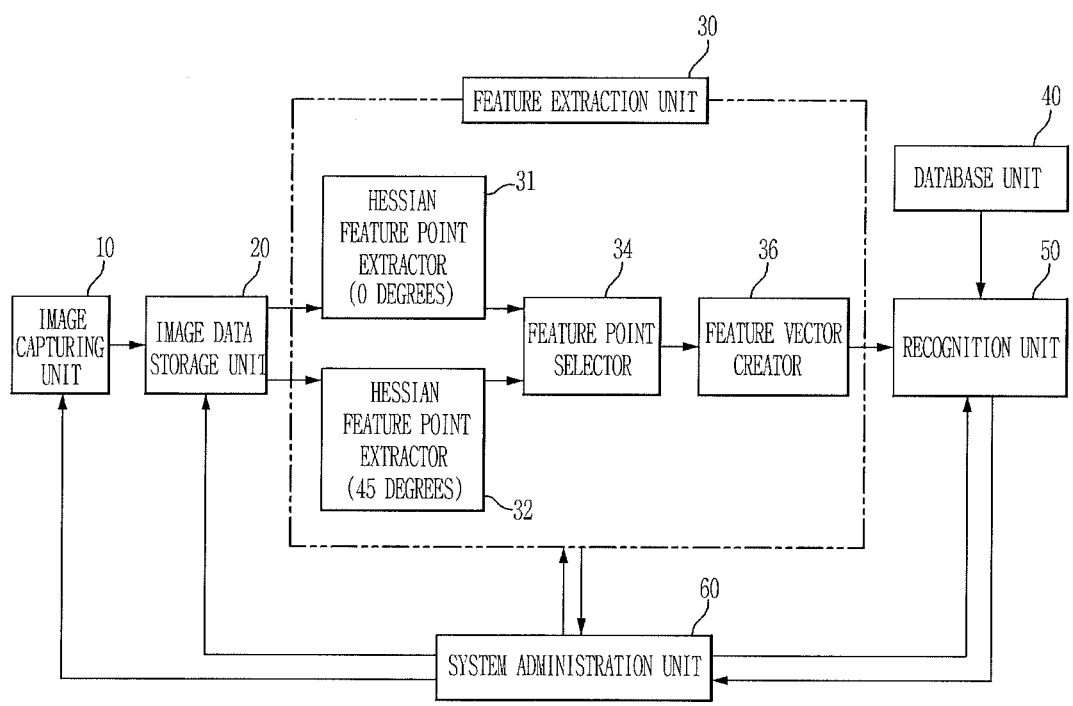
FIG. 1 is a block diagram of an object recognition system using a feature extraction algorithm based on a model of human vision according to an embodiment.

Reference will now be made in detail to embodiments, examples of which are illustrated in the accompanying drawings, wherein like reference numerals refer to like elements throughout.

A human vision system extracts features from an object using filters having various angles to correctly recognize the object. In order to provide an object recognition system that exhibits high resistance to environmental variation using a feature extraction algorithm based on a model of human vision, therefore, features may be extracted using filters having various angles used in human vision. One or more embodiments relate to a local feature type object recognition system and method that recognize an object using an algorithm based on a model of human vision.

FIG. 1 is a block diagram of an object recognition system using a feature extraction algorithm based on a model of human vision according to an embodiment.

The object recognition system includes an image capturing unit 10, an image data storage unit 20, a feature extraction unit 30, a database unit 40, a recognition unit 50, and a system administration unit 60.

The image capturing unit 10 captures an image of an object as image data. The image capturing unit 10 may include a camera or a camcorder. Also, the image capturing unit 10 may include a single camera, a stereo camera, or three or more cameras.

The image data storage unit 20 receives and stores the image data from the image capturing unit 10 and transmits the stored image data to the feature extraction unit 30.

The feature extraction unit 30 extracts feature vectors from the image data received from the image data storage unit 20 and transmits the extracted feature vectors to the recognition unit 50 and the system administration unit 60. The feature extraction unit 30 includes a Hessian feature point extractor (0 degrees) 31, a Hessian feature point extractor (45 degrees) 32, a feature point selector 34, and a feature vector creator 36.

A Hessian feature point extractor includes a Hessian detector used to recognize an object. The Hessian detector is based on a Haar wavelet function filter. A conventional Haar wavelet function filter has rotational components of only 0 and 90 degrees. In this embodiment, each Hessian feature point extractor includes a Hessian detector having a filter having rotational components of 45 and 135 degrees in addition to the conventional Haar wavelet function filter.

The Hessian feature point extractor (0 degrees) 31 outputs determinant values of points of an image based on result values of differential filters that have not been rotated. Determinant values of points of an image are values of points of an image that is secondarily differentiated considering both x and y directions.

The Hessian feature point extractor (45 degrees) 32 outputs determinant values of points of an image based on result values of differential filters that have been rotated 45 degrees.

The feature point selector 34 selects points of the image, from which feature vectors will be extracted, based on the determinant values of the respective points of the image output by the Hessian feature point extractors 31 and 32.

The feature vector creator 36 creates feature vectors from the points of the image transmitted from the feature point selector 34. The feature vectors created by the feature vector creator 36 have positions and orientations based on the points selected by the feature point selector 34.

The database unit 40 stores information on existing objects.

The recognition unit 50 determines whether the object captured by the image capturing unit 10 is stored in the database unit 40 through comparison with the database unit 40 based on information on the object and commands received from the feature extraction unit 30 and the system administration unit 60. Upon determining that the captured image of the object is stored in the database unit 40, the recognition unit 50 retrieves information on the object from the database unit 40. Object information includes object names or object positions. Also, the retrieved information on the object is transmitted to the system administration unit 60, which uses the information on the object.

The system administration unit 60 commands the image capturing unit 10 to output image data, commands the image data storage unit 20 to store the image data, and commands the feature extraction unit 30 to extract feature vectors. Also, the system administration unit 60 commands the recognition unit 50 to recognize an object and receives drawn information on the object, which results from recognition of the object. Upon reception of the drawn information on the object from the recognition unit 50, the system administration unit 60 may display the information on the object such that a user may see the information on the object or transmit the information on the object to another control command source.

The image capturing unit 10, the image data storage unit 20, the feature extraction unit 30, the database unit 40, the recognition unit 50 and/or the system administration unit 60 may include a computer, or have their operations performed by a computer.

Figure 2:
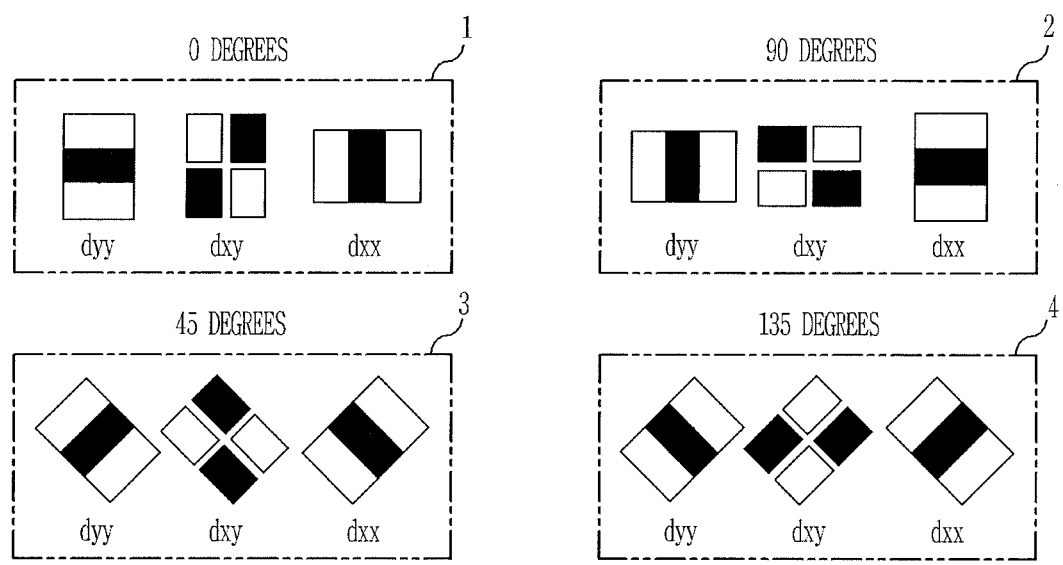
FIG. 2 is a schematic view illustrating a rotational component filter according to an embodiment.

FIG. 2 is a schematic view illustrating a rotational component filter according to an embodiment.

A process by which the feature extraction unit 30 extracts an image having a predetermined rotational component among rotational components of the image stored in the image data storage unit 20 may be performed using a filter having a predetermined rotational component.

In this embodiment, the object recognition system includes a filter 1 having a rotational component of 0 degrees, a filter 2 having a rotational component of 90 degrees, a filter 3 having a rotational component of 45 degrees, and a filter 4 having a rotational component of 135 degrees. These filters have rotational components of 0 degrees, 45 degrees, 90 degrees, and 135 degrees based on human vision having a rotational range approximate to 180 degrees such that the rotational components of the filters are as close as possible to the human vision.

The Haar wavelet function filter, which forms the base of a conventional Hessian detector used for object recognition, includes only the filter 1 having a rotational component of 0 degrees and the filter 2 having a rotational component of 90 degrees. In this embodiment, a feature extraction system further includes the filter 3 having a rotational component of 45 degrees and the filter 4 having a rotational component of 135 degrees. For a Haar wavelet function used for feature extraction, the filter 3 having a rotational component of 45 degrees also functions as the filter 4 having a rotational component of 135 degrees. Therefore, object recognition may be achieved in four directions through addition of only the filter 3 having a rotational component of 45 degrees.

From a matrix consisting of secondary differential values (see Equation 1), a Hessian detector uses determinants of the matrix as a principal function (see Equation 2).

$$H = \begin{bmatrix} DxxDxy \\ DxyDyy \end{bmatrix} \quad \text{Equation 1}$$

$$\det(H) = DxxDyy - (wDxy)^2 \quad \text{Equation 2}$$

In Equation 1, H is a Hessian matrix, Dxx is a secondary differential value in an x direction, Dxy is a secondary differential value in x and y directions, and Dyy is a secondary differential value in a y direction. In the Hessian matrix, values of a function of f(x, y) that is partially differentiated in a y direction and then in an x direction are equal to values of the function of f(x, y) that is partially differentiated in the x direction and then in the y direction.

In Equation 2, det(H) is an equation to obtain determinants of the matrix H, and w is a constant value.

When Equations 1 and 2 are applied to the filter 3 having a rotational component of 45 degrees and the filter 4 having a rotational component of 135 degrees, respectively, determinant values are equal although Hessian matrix types are different. This is because, as described above, values of the function of f(x, y) that is partially differentiated in the y direction and then in the x direction are equal to values of the function of f(x, y) that is partially differentiated in the x direction and then in the y direction.

The filter 3 having a rotational component of 45 degrees has determinant values, which are equal to matrix values of the filter 4 having a rotational component of 135 degrees. Therefore, result values of four directional components, which human uses as a principal factor in object recognition, may be obtained through addition of only the filter 3 having a rotational component of 45 degrees, thereby achieving an object recognition system that is closer to human vision and thus improving object recognition performance.

The Hessian detector exhibits high resistance to geometric invariance but low resistance to rotation or view point change. In this embodiment, the object recognition system exhibits high resistance to environmental variation when the filter 3 having a rotational component of 45 degrees shown in FIG. 2 is included in the object recognition system.

Figure 3:
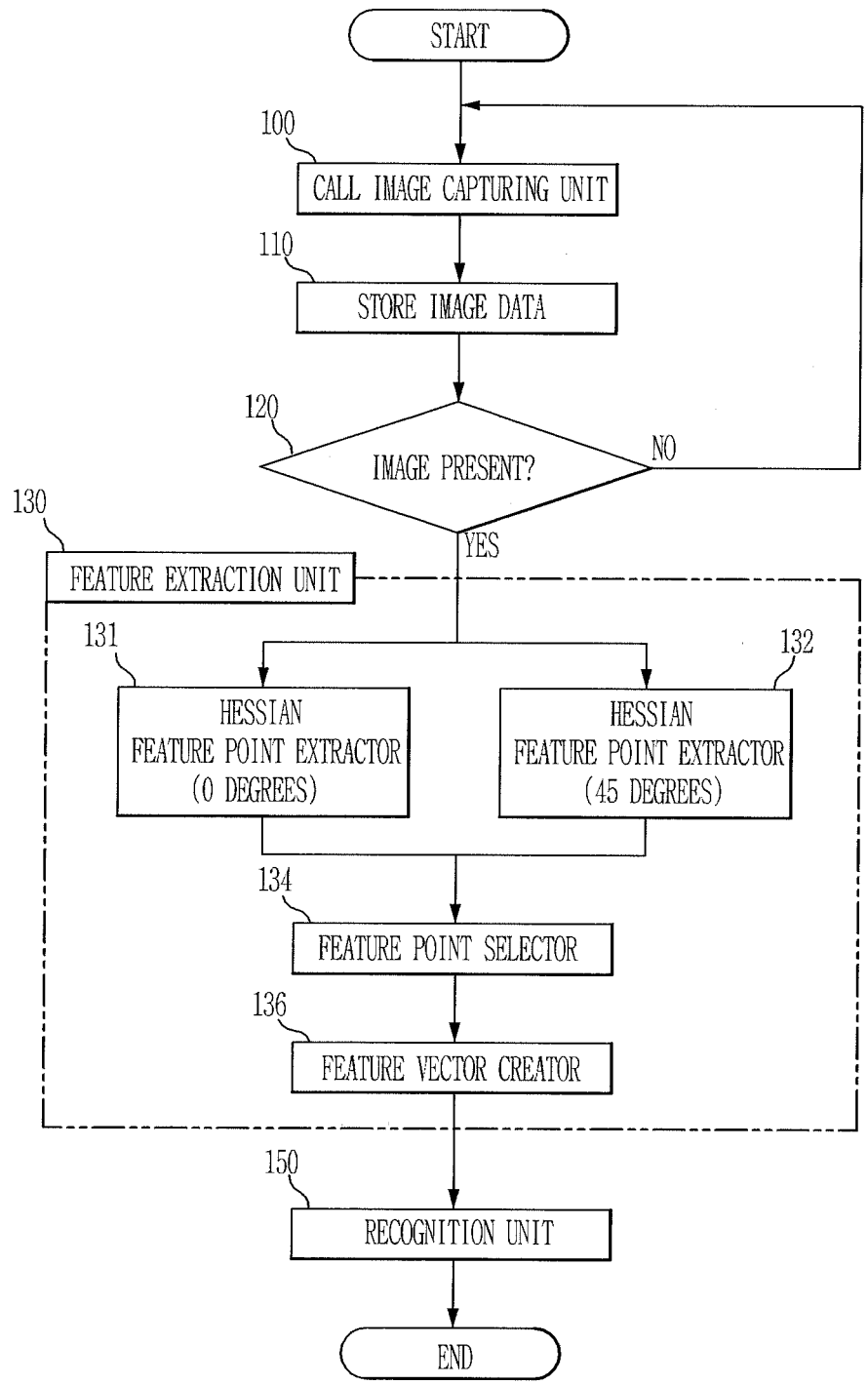
FIG. 3 is a flow chart illustrating the operation of the object recognition system according to an embodiment.

FIG. 3 is a flow chart illustrating the operation of the object recognition system according to an embodiment.

For object recognition, the system administration unit 60 calls the image capturing unit 10 (100). The image capturing unit 10 captures an image, which is then stored in the image data storage unit 20 (110). When image data are not present, the image capturing unit 10 is called again, and, when image data are present, feature vectors are created through the feature extraction unit 30 (120). Detailed operation of the feature extraction unit 30 is as follows.

First, candidate points, from which feature vectors will be created, are primarily extracted from the transmitted image data through Hessian detectors having different properties (131, 132). One of the Hessian detectors includes the filter 1 having a rotational component of 0 degrees, and the other Hessian detector includes the filter 3 having a rotational component of 45 degrees. Feature points of the transmitted image that have not been rotated are extracted through the Hessian detector including the filter 1 having a rotational component of 0 degrees (131). Feature points of the transmitted image that have been rotated 45 degrees are extracted through the Hessian detector including the filter 2 having a rotational component of 45 degrees (132). The points extracted through the two Hessian feature point extractors are transmitted to an input signal at a point selection operation.

Feature points are selected from the candidate points of the transmitted image (134). The feature points are selected as follows. First, it is determined whether coordinates overlap between candidate points. Second, when coordinates overlap between candidate points, it is determined which points have larger determinant properties. Third, the points having larger determinant properties are selected.

The feature vector creator 36 creates feature vectors from the selected points of the image transmitted from the feature point selector 34 (136). The orientation and size of the feature vectors are based on the selected points of the image.

The created feature vectors are transmitted to the recognition unit 50, which determines whether the object is stored in the database unit 40 through comparison with the database unit 40 based on feature information received from the feature extraction unit 30 and draws information on the object stored in the database unit 40 (150). Object information includes object names or object positions. The retrieved information on the object is transmitted to the system administration unit 60. The information on the object is used to control the system administration unit 60.

Figure 4:
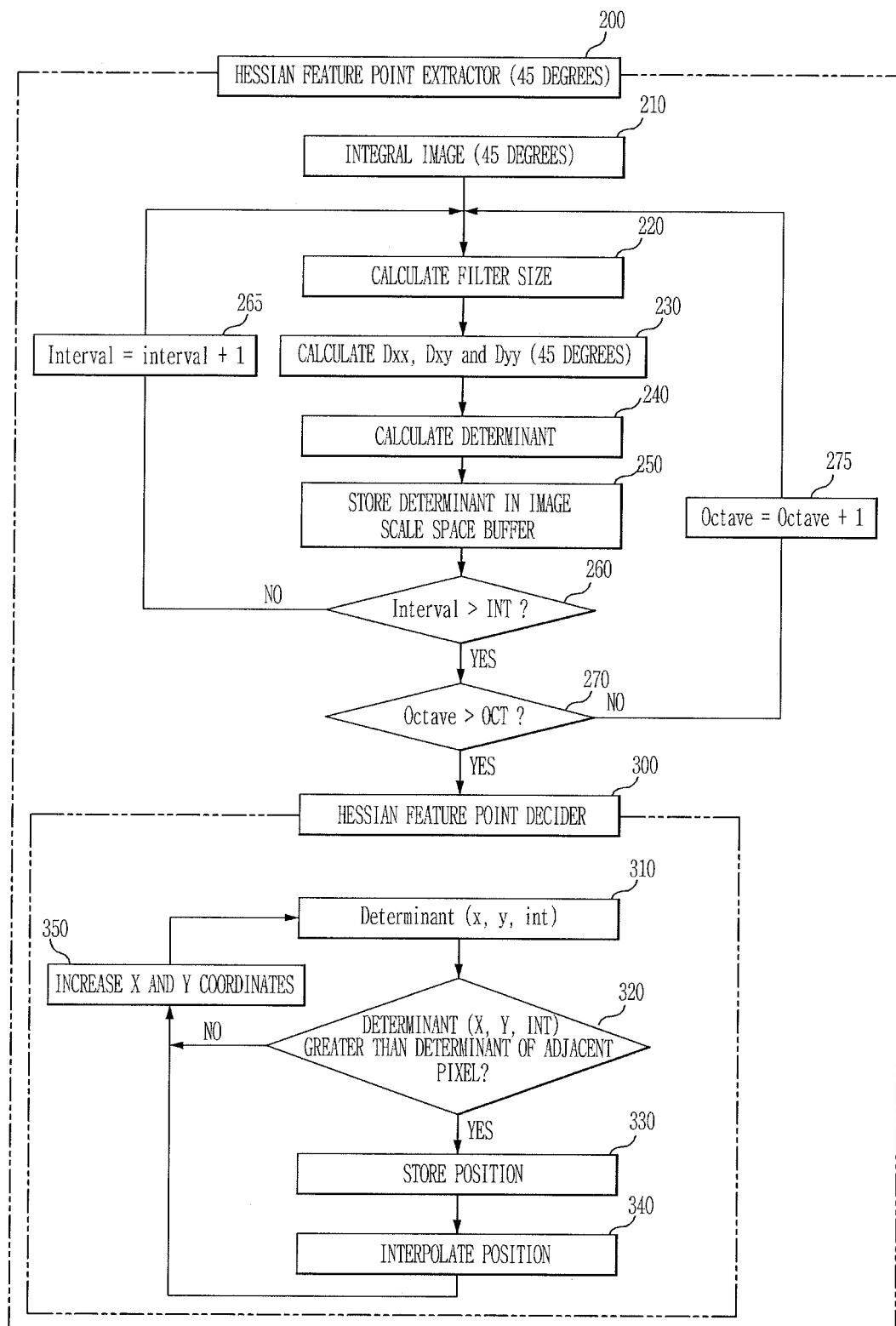
FIG. 4 is a flow chart illustrating the operation of a feature point extractor according to an embodiment.

FIG. 4 is a flow chart illustrating the operation of a feature point extractor according to an embodiment.

One of the feature point extractors 31 and 32, i.e., the Hessian feature point extractor (45 degrees) 32, is shown in FIG. 4.

A 45-degree Hessian feature point extraction process (200) is performed as follows. First, when an integral image corresponding to 45 degrees is applied (210), filter size is calculated (220). Subsequently, Dxx, Dxy, and Dyy, which are secondary differential values in x and y axes, are calculated (230). Determinants of a matrix consisting of Dxx, Dxy, and Dyy, which are calculated secondary differential values, are calculated (240). The image having the calculated determinant values is stored in an image scale space buffer (250). An interval of the stored image is compared with a predetermined interval INT (260). The interval is a value indicating a degree of blurring while a Gaussian blurring effect is applied to the image to extract feature points of the image. When the interval of the storage image is less than the predetermined interval INT, the interval is increased by 1, and filter size is recalculated (265). When the interval of the storage image is greater than the predetermined interval INT, the procedure advances to an Octave comparison operation (270). When an octave of the stored image is less than a predetermined octave OCT, the octave is increased by 1, and filter size is recalculated (275). When the octave of the stored image is greater than the predetermined octave OCT, the procedure advances to a Hessian feature point decision operation (300). The octave is a value indicating a degree of reduction of image size while a Gaussian blurring effect is applied to the image to extract feature points of the image.

The Hessian feature point decision operation (300) is performed as follows. First, a determinant (x, y, int) is calculated (310). Subsequently, it is determined whether the determinant (x, y, int) has a greater value than a determinant of an adjacent pixel (320). When the determinant (x, y, int) is greater than the determinant of the adjacent pixel, x and y coordinates are increased, and the determinant (x, y, int) is recalculated (350). When the determinant (x, y, int) is less than the determinant of the adjacent pixel, the corresponding coordinates are stored (330) and positionally interpolated (340), x and y coordinates are increased, and the determinant (x, y, int) is recalculated (350).

Figure 5:
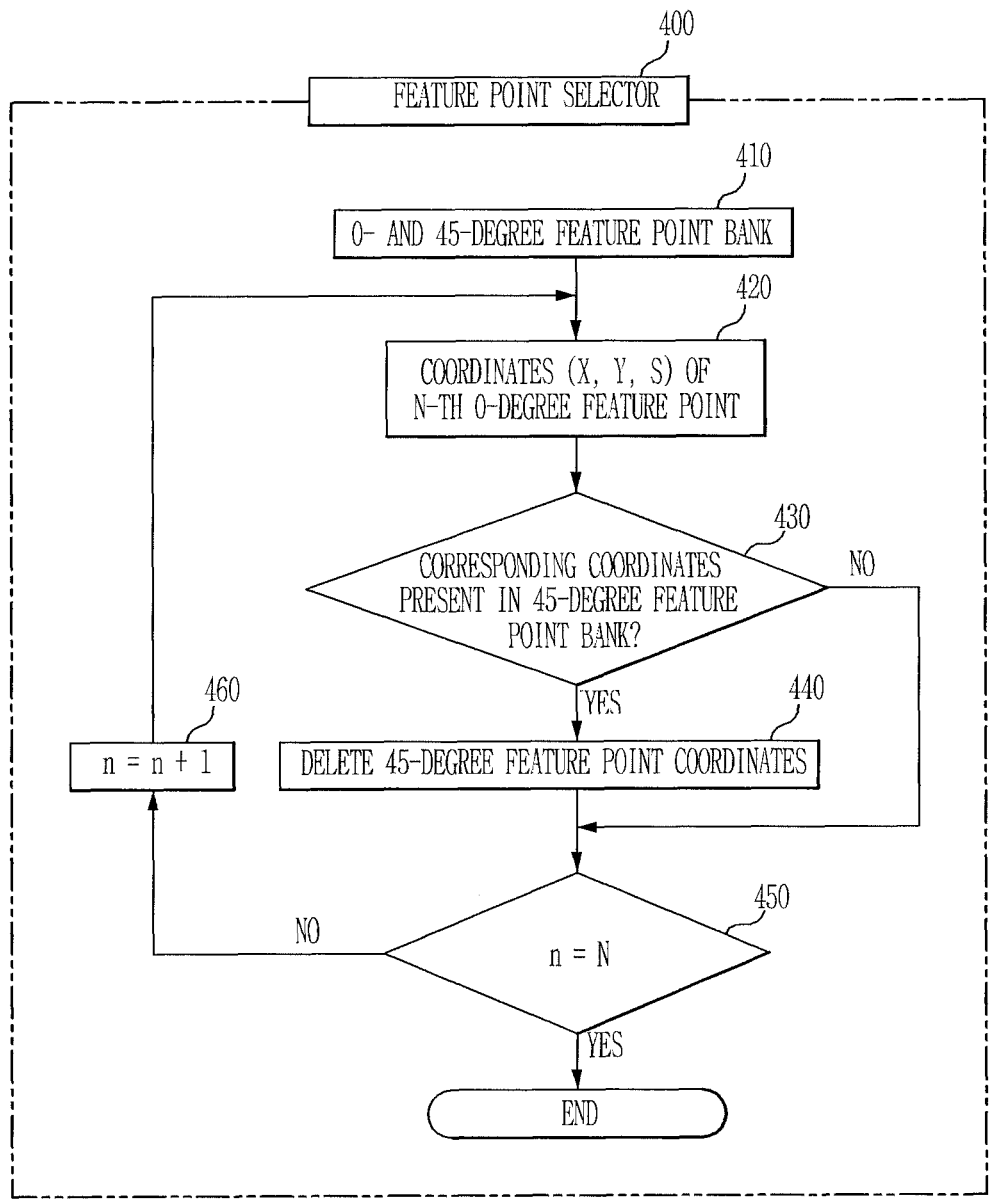
FIG. 5 is a flow chart illustrating the operation of a feature point selector according to an embodiment.

FIG. 5 is a flow chart illustrating the operation of a feature point selector according to an embodiment.

A feature point selection process (400) is performed as follows. First, a 0- and 45-degree feature point bank is created (410). Subsequently, coordinates (x, y, s) of an n-th 0-degree feature point are selected (420). It is then determined whether coordinates coinciding with the selected feature point coordinates (x, y, s) are present in the 45-degree feature point bank (430). When coordinates coinciding with the selected feature point coordinates (x, y, s) are present in the 45-degree feature point bank, 45-degree feature point coordinates are deleted (440), and an operation of comparing an n value with a predetermined N value is performed (450). When coordinates coinciding with the selected feature point coordinates (x, y, s) are not present in the 45-degree feature point bank, the operation of comparing the n value with the predetermined N value is performed (450). When the n value is equal to the predetermined N value, the selection operation is ended. When the n value is not equal to the predetermined N value, the n value is increased by 1 (460), and coordinates (x, y, s) of the n-th 0-degree feature point are selected.

As is apparent from the above description, one or more embodiments provide higher invariance performance and more stable recognition performance than a conventional algorithm. Also, one or more embodiments contribute to intelligent robot popularization and service in spaces containing a variety of objects.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An object recognition system comprising:
    an image data storage unit to store a captured image;
    a feature extraction unit to extract an image having a first rotational component among rotational components of the image stored in the image data storage unit and to extract an image having a second rotational component among the rotational components of the image stored in the image data storage unit, and to extract feature vectors based on the extracted images;
    a database unit to store object information;
    a recognition unit to determine whether an object corresponding to the captured image is present in the database unit through comparison between the feature vectors extracted by the feature extraction unit and the object information stored in the database unit and to recognize information on the object stored in the database unit based on the determination as to whether the object corresponding to the captured image is present in the database unit; and
    a system administration unit to receive the information on the object recognized by the recognition unit.

2. The object recognition system according to claim 1, wherein the feature extraction unit comprises a feature point extractor, a feature point selector, and a feature vector creator.

3. The object recognition system according to claim 2, wherein the feature point extractor comprises a Hessian feature point extractor to allow the image stored in the image data storage unit to pass through a filter having a predetermined rotational component so as to extract feature points.

4. The object recognition system according to claim 3, wherein the feature point extractor extracts candidate points, based on which feature vectors will be created, from the image information.

5. The object recognition system according to claim 4, wherein the feature point extractor comprises:
    a first feature point extractor to extract the image having the first rotational component and to extract feature points based on the extracted image; and
    a second feature point extractor to extract the image having the second rotational component and to extract feature points based on the extracted image.

6. The object recognition system according to claim 5, wherein the feature point selector selects feature points from the candidate points extracted by the feature point extractor.

7. The object recognition system according to claim 6, wherein the feature point selector determines whether coordinates overlap between the candidate points and selects points having greater positional change as feature points when coordinates overlap between the candidate points.

8. The object recognition system according to claim 7, wherein the feature vector creator creates feature vectors based on the points selected by the feature point selector.

9. The object recognition system according to claim 2, wherein the recognition unit determines whether a corresponding object is present in the database unit through comparison between the feature vectors extracted by the feature extraction unit and the database unit and recognizes and transmits information on the object to the system administrator unit upon determining that the object is present in the database unit.

10. The object recognition system according to claim 5, wherein the first rotational component includes a 0 degree rotational component, and the second rotational component includes a 45 degree rotational component.

11. The object recognition system according to claim 5, wherein
    the first rotational component includes a 0 degree rotation component and a 90 degree rotational component, and
    the second rotational component includes a 45 degree rotational component and a 135 degree rotational component.

12. An object recognition method comprising:
    capturing an image of an object as image data;
    extracting an image having a first rotational component among rotational components of the image data and an image having a second rotational component among the rotational components of the image data, and extracting feature points based on the extracted images;
    determining whether coordinates overlap between the extracted feature points and selecting points having greater positional change as feature points when coordinates overlap between the extracted feature points;

creating feature vectors based on the selected feature points; and determining whether a corresponding object is present in a database unit through comparison between the created feature vectors and object information stored in the database unit and outputting information on the object upon determining that the object is present in the database unit.

13. The object recognition method according to claim 12, wherein the extracting, the determining whether coordinates overlap, the creating and the determining whether a corresponding object is present are performed by a computer.

14. A method comprising:

extracting, by a computer, images from image data using a Hessian detector having at least three rotational components;

creating, by a computer, feature vectors based on the extracted images; and determining, by a computer, whether a corresponding object is present in a database unit through comparison between the created feature vectors and object information stored in the database unit.

15. A method according to claim 14, further comprising:

outputting, by a computer, information on the object upon determining that the object is present in the database unit.

16. A method according to claim 14, wherein the at least three rotational components include rotational components of 45 degrees and 135 degrees.

17. A method according to claim 14, wherein the at least three rotational components include rotational components of 0 degrees, 45 degrees, 90 degrees and 135 degrees.

* * * * *

UNITED STATES PATENT AND TRADEMARK OFFICE
CERTIFICATE OF CORRECTION

PATENT NO. : 8,731,326 B2
APPLICATION NO. : 13/197114
DATED : May 20, 2014
INVENTOR(S) : Ji Hyo Lee et al.

It is certified that error appears in the above-identified patent and that said Letters Patent is hereby corrected as shown below:

On the Title Page

Column 2, Line 1, Item [74] (Attorney Agent, or Firm) Delete "Stass & Halsey LLP" and insert -- Staas & Halsey LLP --, therefor.

In the Claims

Column 8, Line 54, In Claim 11, Delete "degree rotation" and insert -- degree rotational --, therefor.

Signed and Sealed this
Sixth Day of January, 2015

Michelle K. Lee
*Deputy Director of the United States Patent and Trademark Office*